United States Patent Office 2,958,191
Patented Nov. 1, 1960

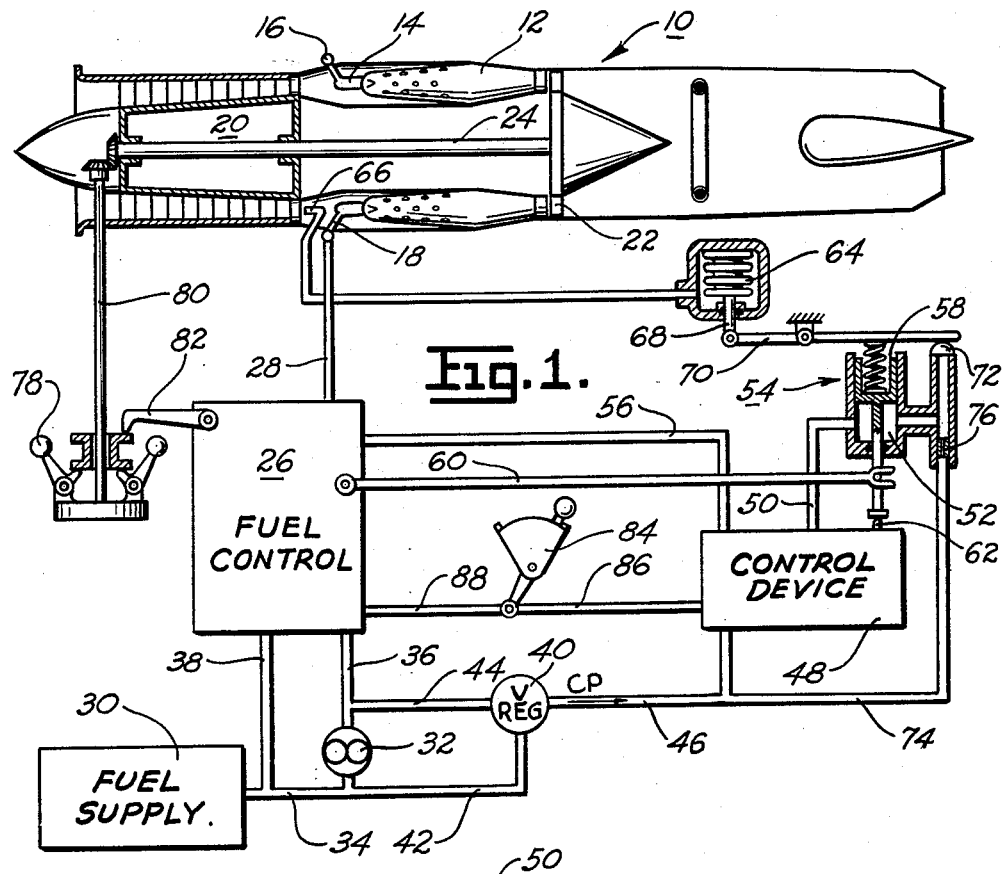

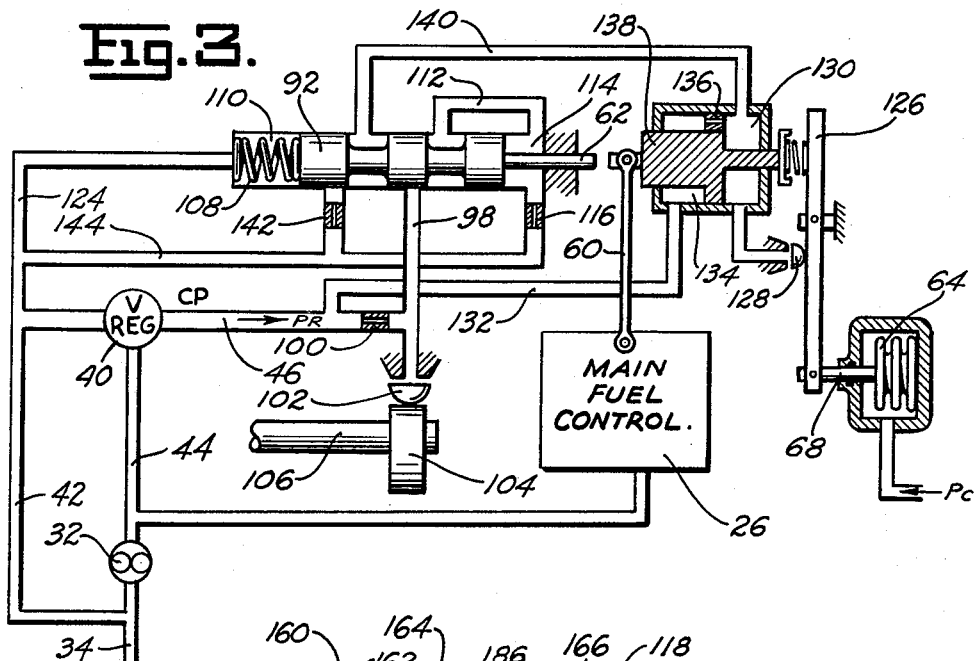

2,958,191

CONTROL APPARATUS

Howard J. Williams, South Bend, Ind., assignor to The Bendix Corporation, a corporation of Delaware Filed Dec. 3, 1956, Ser. No. 625,979

9 Claims. (Cl. 60—39.28)

The present invention relates in general to control apparatus and more particularly to fluid pressure responsive failure protection control apparatus for an engine or like device.

In prior art control apparatus, including an evacuated bellows member or capsule utilized as an input sensor to produce a force which is proportional to a pressure to be sensed and that is surrounding the bellows member or capsule which pressure may be a function of an engine operating pressure such as compressor discharge pressure or some other pressure along the gas flow path through an internal combustion engine such as a gas turbine engine, since the bellows member is evacuated the output force provided by the bellows member is proportional to the absolute pressure surrounding the bellows. This so provided output force may be utilized in an engine operating control system, such as a servo system, to produce a motion or the travel of a servo piston or the like device, which is a function of the initially sensed engine operating condition or pressure. However, should the bellows member or capsule rupture, the evacuation of the bellows member is lost. This is equivalent to an input sensed pressure of zero in that the differential pressure across the bellows member is at that time zero. This in turn causes the output servo power piston to go to the zero position, and as fuel flow to the engine may be controlled as a function of this input pressure the result is that fuel flow to the engine is reduced to substantially zero resulting in what may be a dangerous operation of the engine. For example, in an internal combustion engine such as a gas turbine engine which is operative with an aircraft, should the aircraft be in the process of a take-off, the failure of the engine operation sensing bellows member may result in a catastrophic accident.

Accordingly, it is an object of the present invention to provide improved control apparatus for an engine such as a gas turbine engine or like operational device.

It is another object of the present invention to provide an improved control apparatus for an engine or other operational device, which control apparatus includes a failure protection arrangement that causes the engine or device to operate in a predetermined desired or satisfactory manner.

It is a further object of the present invention to provide an improved fuel control apparatus for an engine, which apparatus in the event of failure will provide a predetermined fuel flow to the engine to enable a desired or satisfactory operation of the engine to be maintained.

It is an additional object of the present invention to provide an improved control apparatus for an engine which is more reliable and safe in operation.

It is a different object of the present invention to provide an improved control apparatus for an aircraft engine, which apparatus includes an evacuated bellows member subject to failure, and which apparatus in the event of such a failure of the evacuated bellows member will provide the engine fuel flow controlling valve member with a predetermined minimum position for allowing the aircraft to continue in a predetermined minimum degree of operation as may be desired for the safe operation of the aircraft.

These and other objects and advantages of the present invention will become apparent in view of the following description taken in conjunction with the drawings wherein:

Figure 1 is a diagrammatic view of control apparatus in accordance with the present invention;

Figure 2 is a schematic view of the subject control apparatus;

Figure 3 is a schematic view of a modification of the subject apparatus; and

Figure 4 is a further modification of the control apparatus in accordance with the present invention.

In Figure 1 there is shown a gas turbine engine 10 including a plurality of combustion chambers 12 each including a fuel nozzle 14 supplied fuel from a common fuel manifold 16 through a plurality of individual fuel lines 18. A compressor 20 is connected to a turbine 22 through an interconnecting drive shaft 24. A fuel control 26, including a valve member or the like, is connected through an output conduit 28 to supply metered fuel to the fuel manifold 16. A fuel supply 30 is operative with a fuel pump 32 which supplies fuel from an input conduit 34 connected to the fuel supply 30 and through an output conduit 36 connected to the fuel control 26. A by-pass conduit 38 is operative between the main fuel control 26 and the input conduit 34 as well known to persons skilled in this art.

A conventional fluid pressure regulator 40 is operative with control fluid at pump inlet pressure as received through the conduit 42 and control fluid at pump outlet pressure as received through the conduit 44 to provide regulated pressure control fluid through the output conduit 46. A control device 48 is operative with the regulated control fluid as received through the conduit 46 for providing control fluid through the output conduit 50 to the fluid chamber 52 of a control member 54. A conduit 56 is connected to the control device for draining low pressure control fluid through fuel control 26 to conduit 38 at pump inlet pressure and also to provide a pump inlet pressure reference to be utilized in control device 48 as described hereinafter in connection with the description of Figure 2. The control member 54 includes a control piston 58 operative with the fluid chamber 52 for controlling the position of a control lever 60 operative with the main fuel control 26 for determining the operation of the main fuel control 26. In this respect the control lever 60 may be operative if desired to control the rotational position of the main metering valve as well known to persons skilled in this art. The control piston 58 is also operative with input arm 62 of the control device 48. An evacuated bellows member 64 is responsive to the discharge or some other predetermined operational pressure of the compressor 20 as sensed by the device 66. The bellows member 64 includes an output arm 68 operatively connected to one end of a control lever 70 for determining the position of a half-ball or flapper valve member 72 which is operative with the fluid chamber 52 for determining the pressure of the control fluid within the latter fluid chamber 52. A conduit 74 is connected to the fluid pressure regulator 40 for providing pressure regulated control fluid through the bleed member 76 to the fluid chamber 52. A speed sensitive flyweight member 78 may be operatively connected through the shaft 80 and associated gearing members to the drive shaft 24. The speed responsive flyweight member 78 is operative through a control arm 82 for controlling the operation of the main fuel control 26 as a function of engine speed. A control throttle member 84 is provided and is operative through a control arm 86 for controlling the operation of the control device 48 as a function of throttle position and is operative through a control arm 88 for determining the operation of the main fuel control 26 as a function of throttle position.

Referring to Figure 2 there is shown a valve member 92 operative with a control fluid path including the input conduit 46 the conduit 94 and the conduit 96. The valve member 92 is also operative with a fluid chamber 98 which receives control fluid at regulated pressure through the bleed member 100 and includes a servo half-ball or flapper valve member 102 operative with a cam member 104 which is positioned as a function of the throttle member 84 shown in Figure 1 through the throttle shaft 106 and the rack member 107 and pinion 109. If the valve member 92 is moved to the left from the position as shown in Figure 2 against the control spring member 108 and the pressure of the control fluid within the fluid chamber 110 which control fluid is at pump inlet pressure as received through the conduit 56, then the fluid conduit 98 is connected through the conduit 112 to a fluid chamber 114. The latter fluid chamber 114 is also connected through the bleed member 116 to the conduit 56 as shown in Figure 2. The piston shaft member 118 is connected to the control piston 58 as shown in Figure 1.

In Figure 3 there is shown a modification of the control device in accordance with the present invention. In Figure 3 the valve member 92 is shown operative with the control spring 108 in the fluid chamber 110, which latter fluid chamber is connected through the conduit 124 to the conduit 42 connected to the pump inlet conduit 34. The evacuated bellows member 64 and its output control arm 68 are connected to a pivoted shaft member 126 which is operative to control the position of a half-ball 128 for determining the pressure of the control fluid within the fluid chamber 130. The latter fluid chamber 130 receives control fluid from the pressure regulated control fluid conduit 46 through the conduit 132 to the fluid chamber 134. A control bleed 136 is provided in the control piston 138 operative between the fluid chambers 134 and 130. In the event of failure of the evacuated bellows member 64 the control valve member 128 is closed such that the control piston member 138 moves to the left to thereby move the valve member 92 to the left to provide a discharge path for the control fluid within the fluid chamber 130 through the conduit 140 and the bleed member 142 to the fluid conduit 144 which is connected to the conduit 124. The remainder of the Figure 3 apparatus is generally similar to the apparatus as shown in Figure 2.

In Figure 4 there is shown a further modification of the apparatus in accordance with the present invention in which pressure regulated control fluid from the conduit 46 passes through a control bleed member 150 into a fluid chamber 152 provided with a half-ball or flapper valve member 154 for controlling the pressure of the control fluid within the fluid chamber 152. The latter half-ball valve member 154 is controlled in position by a pivoted control arm 156 operative with a control spring member 158 by the piston shaft 118 of the control piston member 58 as shown in Figure 1. Control fluid from the fluid chamber 152 is operative with a fluid chamber 160 including a control spring member 162 and a control piston member 164. The control piston member is movable in position as a function of the pressure of the control fluid within the fluid chamber 152 and is operative to control the position of a half-ball valve member 166. A movable valve member 168 including an annular recess 170 is controlled in position by a half-ball valve member 172 as a function of the position of the control throttle member 84 through the throttle shaft 106 and the throttle cam 104. Control fluid from the regulated pressure control fluid conduit 46 passes through the control bleed 174 into the fluid chamber 176 such that the position of the half-ball member 172 determines the pressure of the control fluid within the fluid chamber 176 and thereby determines the position of the control valve member 168 against the action of the control spring 177 and the control fluid within the fluid chamber 178 connected through the conduit 56 to the source of reference control fluid which may correspond to the control fluid at pump inlet pressure within the inlet conduit 34 leading to the fuel pump 32. When the control valve member 168 is moved to the right as a result of closing the half-ball valve member 172. A path for the regulated pressure control fluid from the conduit 46 is provided including the conduit 180 leading to the annular recess 170 of the valve member 168 and the conduit 182 leading from the annular recess 170 through the half-ball valve 166 to a conduit 184 which may lead to the conduit 50 as shown in Figure 1. A fluid chamber 186 is provided at the second end of the control piston 164 for receiving regulated pressure control fluid through the conduit 188 when the control valve member 168 is positioned to the right of its position as shown in Figure 4.

In the operation of the control apparatus in accordance with the present invention in the event of a failure of the evacuated control bellows member 64, such as in the event of a rupture resulting in the loss of the evacuation of the bellows member 64, the control arm 68 as shown in Figure 1 moves downward to its extreme position such that the half-ball valve member 72 is open to its maximum position. This results in a decrease in pressure of the control fluid within the fluid chamber 52. This decrease in the control fluid within the fluid chamber 52 causes the control piston member 58 to move downward such that the piston shaft 118 moves the control arm 62 connected to the valve member 92 as shown in Figure 2 resulting in movement of the valve member 92 to the left of its position shown in Figure 2.

Referring to Figure 2, when the valve member 92 is moved to the left, this provides a control fluid passage from the regulated pressure control fluid passage 46 through the conduit 94 and the conduit 96 to the conduit 50 leading to the fluid chamber 52 as shown in Figure 1. It should be noted from Figure 2 that the fluid passage comprised of conduits 46, 94, 96, and 50 supplies unrestricted flow from regulator 40 to chamber 52 shown in Figure 1 during emergency operation, such that the quantity of fluid supplied to chamber 52 is much greater than during normal operation of the control apparatus, as when control fluid is supplied to the chamber 52 through conduit 74 and bleed member 76. Half-ball member 72 is designed such that its maximum open position will be unrestrictive for the low quantity of fluid supplied to chamber 52 during normal operation of the control apparatus, but will be restrictive for the increased quantity of fuel supplied during emergency operation, thus causing the pressure of fluid in chamber 52 to increase.

Further as the valve member 92 is moved to the left of its position as shown in Figure 2 regulated pressure control fluid passing through the bleed 100 to the conduit 98 then passes through the conduit 112 to the fluid chamber 114 and produces a force tending to hold the valve member 92 in the above said position to the left of its position as shown in Figure 2. In this respect the half-ball valve member 102 prevents the valve member 92 from being held in its failure position to the left of its position as shown in Figure 2 unless the throttle member 84 is in a predetermined position. If a failure of the bellows member has not occurred, the half-ball valve member 102 is operative during particularly the cranking or start up period of the gas turbine engine to prevent the valve member 92 from being held in its failure position to the left of the position as shown in Figure 2. In this respect during the start up of the gas turbine engine 10 the compressor discharge pressure of the compressor 20 as sensed by the pick up device 66 and as sensed by the evacuated bellows member 64 is not sufficient to close the half-ball valve member 72 therefore, during a start up period of the gas turbine engine 10 the control valve member 58 may be in its lowermost position such that the piston shaft 118 has contacted the control arm 62 and moved the valve member 92 to the left of its position as shown in Figure 2. However, the throttle cam 104 is operative during the start up period to open the half-ball valve member 102 and prevent a fluid pressure build up in the conduit 98 and 112 leading to the fluid chamber 114 which would hold the valve member 92 in its failure position. As the cranking and actual starting of the gas turbine engine occurs the normal servo action is permitted which moves the control piston member 58 away from the contact arm 62. Thus when the throttle member 84 is moved in position after the gas turbine engine is started in operation the throttle cam 104 is then operative to close the flapper valve 102 to ready the failure protection apparatus including the control valve member 92. The failure protection apparatus including the valve member 92 is not thereafter operative until a failure of the evacuated bellows member 64 occurs.

In the operation of the apparatus shown in Figure 3 after the initial start up period such that the throttle cam 104 has closed the flapper valve 102, if a failure of the evacuated bellows member should occur the flapper valve 128 will be closed to thereby increase the pressure of the control fluid within the fluid chamber 130 and move the control piston member 138 to the left as shown in Figure 3. This results in a contact with the control arm 62 which moves valve member 92 to the left of its position as shown in Figure 3. Since the flapper valve 102 is now closed, the regulated pressure control fluid passes through the bleed member 100 into the fluid chamber 114 and holds the valve member 92 in its failure position to the left of its position as shown in Figure 3. Also, a path is now provided from the fluid chamber 130 through the conduit 140 and the bleed member 142 leading to the conduit 144 and eventually to the input conduit 34 leading to the pump 32. A discharge path is now provided for the control fluid from the fluid chamber 130 which tends to decrease the pressure of the control fluid within the fluid chamber 130 such that the control piston member 138 moves to the right to assume a predetermined minimum fuel flow control position as determined by the control lever 60 operative with the main fuel control 26.

In the operation of the apparatus as shown in Figure 4, after the initial starting period of the gas turbine engine the flapper valve 172 is closed such that the control valve member 168 is moved to the right of its position as shown in Figure 4 to provide a path from the conduit 180 through the annular recess 170 to the conduits 182 and 188. Now if a failure of the evacuated bellows member 64 should occur the piston shaft 118 would move to the left of its position as shown in Figure 4 to contact the control lever 156 to result in the opening of the flapper valve 154. This causes the control piston 164 to move to the left of its position as shown in Figure 4 thereby opening the flapper valve member 166 to provide a flow path for regulated pressure control fluid from the conduit 46 through the conduit 180, the annular recess 170, the conduit 182 through the flapper valve 166 and the conduit 184 to the conduit 50 to thereby increase the pressure of the control fluid within the fluid chamber 52 as shown in Figure 1 and result in moving the piston member 58 upward to a predetermined minimum fuel flow position as determined through the control arm 60 operative with the main fuel control 26.

Although the present invention has been described with a certain degree of particularity it should be understood that the present disclosure has been made only by way of example and that numerous changes in the details of construction and the combination and arrangement of parts may be resorted to without departing from the scope and the spirit of the present invention.

I claim:

1. In control apparatus for an internal combustion engine, said apparatus including an evacuated bellows member responsive to a predetermined engine operating parameter and having an output arm, said apparatus being operative with a source of control fluid, the combination of a first control member including a fluid chamber and being operative for controlling the operation of said engine, a first fluid passage connected between said control fluid source and said chamber, a first flapper valve member operative with said fluid chamber for controlling the pressure of the fluid within said chamber and being responsive to said engine operating parameter as determined by the position of said output arm, a second fluid passage connected between said control fluid source and said chamber, and a second flapper valve member operative with said second passage and being responsive to the position of said output arm as determined by said predetermined operation condition of said bellows member for controlling the supply of control fluid through said second passage.

2. In control apparatus for an engine and including an evacuated bellows member including an output arm, said apparatus being operative with a source of control fluid, the combination of a first engine control member including a fluid chamber and being operative for controlling the operation of said engine, a first fluid passage connected between said control fluid source and said chamber, a first valve member responsive to the position of said output arm and operative with said fluid chamber for controlling the pressure of the fluid within said chamber, a second fluid passage connected between said control fluid source and said chamber, a second control member operative with said second fluid passage and including a second fluid chamber, and a second valve member operative with said second fluid chamber for controlling the fluid pressure within said fluid chamber and responsive to the position of said output arm for controlling the supply of control fluid through said second passage to said first engine control member.

3. In control apparatus for an internal combustion engine including a control throttle member, said apparatus including an evacuated bellows member responsive to a predetermined operating condition of said engine and having an output arm, said apparatus being operative with a source of regulated pressure control fluid, the combination of an engine control member including a fluid chamber and being operatively connected to said engine for controlling the operation of said engine, a first fluid passage connected between said control fluid source and said fluid chamber, a first valve member operative with said fluid chamber for controlling the pressure of the fluid within said fluid chamber in response to the position of said output arm, a second fluid passage connected between said control fluid source and said chamber, with said second fluid passage including a second valve member responsive to the position of said control throttle member for controlling the supply of control fluid through said second passage to said engine control member.

4. In control apparatus including a control device having a predetermined operative condition of failure, said first apparatus being operative with a source of regulated pressure control fluid, the combination of a first fluid chamber including a first fluid passage connected to said control fluid source and being operatively connected to said control device such that said control device is operative to control the pressure of the control fluid within said first fluid chamber, a first valve member operative with said fluid chamber for controlling the pressure of the control fluid within said fluid chamber and being operatively connected to said control device, a second fluid passage operatively connected to said fluid chamber for providing a control fluid removal path, said second fluid passage including a second control valve for controlling the removal of control fluid from said fluid chamber through said second passage.

5. The apparatus of claim 4, with said second control valve being responsive to said predetermined operative condition of failure of said control device for initiating the removal of control fluid from said fluid chamber.

6. In control apparatus for an engine including a control throttle member, said apparatus including a control device subject to a predetermined operative condition of failure, said apparatus being operative with a source of regulated pressure control fluid, the combination of an engine control member operatively connected to said engine for controlling the operation of said engine, said engine control member including a control fluid chamber, a first fluid passage operatively connected between said control fluid source and said fluid chamber, a first valve member movable in position for controlling the flow of control fluid through said first fluid passage, a second valve member operative for controlling the position of said first valve member and responsive to said control throttle member, a third valve member positioned in said passage between said first valve member and said engine control member chamber for controlling the flow of control fluid from said first valve member to said fluid chamber, and a fourth valve member operative to control the position of said third valve member and responsive to said predetermined operative condition of failure of said control device.

7. The apparatus of claim 6, with said second valve member comprising a fluid pressure controlling half-ball operative with a second fluid chamber for controlling the fluid pressure within said second fluid chamber, with said second fluid chamber being operative with said first valve member for controlling the position of said first valve member.

8. In control apparatus including an evacuated bellows member having a predetermined condition of failure, said apparatus being operative with a source of regulated pressure control fluid, said evacuated bellows member having a control arm responsive in position to said predetermined operative condition of said bellows member, a control member including a fluid chamber, a first fluid passage operatively connected between said control fluid source and said fluid chamber, a first valve member operative with said fluid chamber for controlling the pressure of the control fluid in said fluid chamber and responsive to the position of said control arm such that in the case of said predetermined condition of failure said first valve member is operative to decrease the fluid pressure within said fluid chamber, and a second valve member responsive to the position of said control arm, said second valve member being operative with a second fluid passage operatively connected between said control fluid source and said fluid chamber such that in case of said predetermined condition of failure of said bellows member the second valve member is operative to increase the fluid pressure in said fluid chamber to some predetermined value.

9. In control apparatus including a servo-piston having a first fluid chamber, a source of regulated control fluid, and an evacuated bellows having a predetermined condition of failure and operable to control the position of said servo-piston, the combination of first passage means connected between said control fluid source and said first fluid chamber, a valve member having a first and a second position and operable with said first passage means to prevent fluid flow therethrough when said valve member is in said first position and to allow fluid flow from said source to said first fluid chamber when said valve member is in said second position, spring means operative with one end of said valve member to bias said valve member to said first position, said valve member located in fixed spaced relationship with said servo-piston such that on occurrence of the predetermined condition of failure of said bellows, said servo-piston is operable to position said valve member from said first to said second position, a second fluid chamber in communication with the other end of said valve member, second passage means connected between said control fluid source and said second fluid chamber, said valve member operative with said second passage to prevent fluid flow therethrough when said valve member is in said first position and to allow fluid flow therethrough when in said second position, said second fluid chamber containing a regulated control fluid from said source when said valve member is in said second position that is operable to hold said valve member in said second position against the bias provided by said spring means.

References Cited in the file of this patent

UNITED STATES PATENTS

| | | |
|---|---|---|
| 2,643,514 | Jubb | June 30, 1953 |
| 2,678,004 | Harris | May 11, 1954 |
| 2,741,089 | Jagger | Apr. 10, 1956 |
| 2,759,549 | Best | Aug. 21, 1956 |

UNITED STATES PATENT OFFICE

CERTIFICATION OF CORRECTION

Patent No. 2,958,191                  November 1, 1960

Howard J. Williams

It is hereby certified that error appears in the above numbered patent requiring correction and that the said Letters Patent should read as corrected below.

Column 6, line 68, strike out "first"; column 7, line 3, after "said" insert -- first --.

Signed and sealed this 23rd day of May 1961.

(SEAL)
Attest:

ERNEST W. SWIDER
Attesting Officer

DAVID L. LADD
Commissioner of Patents